United States Patent [19]

Blümle

[11] Patent Number: 4,520,060
[45] Date of Patent: May 28, 1985

[54] METHOD FOR FABRICATING A MASTER PLATE AND A MASTER PLATE FABRICATED THEREBY HAVING FITTING BORES DISPOSED AT PRESPECIFIED COORDINATE INTERVALS

[76] Inventor: Rudi Blümle, Schwarzbachstr. 52, D-7000 Stuttgart 80, Fed. Rep. of Germany

[21] Appl. No.: 512,053

[22] Filed: Jul. 8, 1983

[30] Foreign Application Priority Data

Jan. 15, 1983 [DE] Fed. Rep. of Germany ....... 3301178

[51] Int. Cl.³ .............................................. B32B 3/10
[52] U.S. Cl. ...................................... 428/131; 156/64; 156/91; 156/293; 411/511; 411/903
[58] Field of Search ......................... 29/402.14, 526 R; 156/91, 94, 293, 64; 411/511, 908, 903; 428/131, 137

[56] References Cited

U.S. PATENT DOCUMENTS

| | | | |
|---|---|---|---|
| 4,073,215 | 2/1978 | Coope et al. | 409/219 |
| 4,310,963 | 1/1982 | Blumle | 156/305 X |
| 4,370,372 | 1/1983 | Higgins et al. | 156/91 X |
| 4,374,695 | 2/1983 | Ikeda et al. | 156/293 |

Primary Examiner—Robert A. Dawson
Attorney, Agent, or Firm—Edwin E. Greigg

[57] ABSTRACT

A method for producing a master plate and a master plate produced by this method which has highly accurately disposed fitting bores or fitting pins at prespecified coordinate intervals in order to form a precise grid system. The master plate serves to produce clamping plates identical to it for use in machining workpieces or building machinery. The fitting bores in the master plate are derived from insertable fitting sleeves which have a smaller diameter than preliminary bores disposed at the grid intervals in the foundation plate and are measured in their final position, preferably using measuring gauges having a zero dimension tolerance in the desired distance. After the location by measurement, the insertable fitting sleeves are pre-fixed, preferably via end flanges mechanically connected with the contact face of the foundation plate, and once all the insertable fitting sleeves have been pre-fixed (subsequent sleeves being positioned via the zero-dimension measuring gauges relative to previous pre-fixed fitting sleeves), all the fitting sleeves are fixed in final position by the introduction of a settable plastic material.

14 Claims, 2 Drawing Figures

METHOD FOR FABRICATING A MASTER PLATE AND A MASTER PLATE FABRICATED THEREBY HAVING FITTING BORES DISPOSED AT PRESPECIFIED COORDINATE INTERVALS

BACKGROUND OF THE INVENTION

The invention relates to a method for fabricating a master plate and a master plate fabricated thereby having fitting bores disposed at prespecified coordinate intervals.

Clamping plates per se, which are suitable for the accurately fitted and precise clamping and securing of workpieces to be machined or for building machinery and in which bores containing insert sleeves are disposed at precise grid intervals from one another, are known (German Offenlegungsschrift No. 22 32 387; VFW-Focker company publication entitled "VAPA-System"; German Pat. No. 25 57 701; and German Auslegeschrift No. 26 26 155) which are the same as U.S. Pat. Nos. 4,073,215 and 4,310,963, respectively.

In the first two documents mentioned (DE-OS No. 22 32 387 and the VFW-Focker publication), the clamping plates are produced such that bores are first generated in the plate at precise intervals on a grid system, and then insert sleeves having a diameter agreeing with that of the bores are inserted. The bores are created by numerically controlled processing machines of correspondingly high quality and accuracy.

In the remaining publications (German Pat. No. 24 57 701, DE-AS No. 26 26 155), the clamping plates are produced in a completely different manner, however, in the sense they adopt the required high precision of the insert sleeve disposition in the grid system from a master plate, which is responsible for the positioning of the insert sleeves in their bores. In detail, the process of producing such clamping plates for the clamping and securing of workpieces to be machined or for building machinery is such that bores are placed with normal precision in the starting plate—that is, without requiring great precision—with a prespecified dimension for the grid intervals; insert sleeves having a smaller diameter than that of the bores are then inserted, producing an annular interspace all the way around them; finally, the intervals between the various inserted sleeves are determined with the aid of a master plate, serving as a template gauge, which has pins or some sort of positioning elements disposedly spaced apart from one another by highly precise grid interval dimensions. The master plate, which is used only once during fabrication, thus confers its intrinsic accuracy by heredity, as it were, upon the accuracy of a given clamping plate being produced; that is, by introducing a settable plastic material into the interspaces between the diameter of the bore and the outer diameter of the insert sleeve, a fixation of the sleeves in the bores is attained after the plastic material has set. Once the clamping plate is separated from the master plate, the insert sleeves will have taken on the highly precise grid interval dimension and retain it.

In the fabrication of such clamping plates, the fitting or insert sleeves are held in the annular interspace of their receiving bores by means of a plastic material. The accuracy demanded of the master plate is particularly great, because of course tolerances, even if extremely small ones, must be taken into account in making the transfer to a given daughter clamping plate; and these tolerances necessitate an accuracy in the precision positioning of the fixation pins of the master plate which is even higher than the accuracy required and in fact attained for a given clamping plate.

OBJECT AND SUMMARY OF THE INVENTION

It is accordingly the principal object of the invention to fabricate a master plate of this type which then serves in turn as a template gauge for producing high-precision clamping plates for use in building machinery and in machining workpieces.

The invention attains this object with the characteristics disclosed and has the advantage that a sufficiently high precision is attained in positioning the fitting bores or fitting pins in the grid system that even when precision clamping plates are reproduced by a transfer-like method on the basis of the master plate as a template gauge, the clamping plates attain a standard of accuracy which has heretofore been considered unattainable.

The primary reason for the high precision of the master plate which the present invention is capable of furnishing and then conferring upon the clamping plates is because of perceptions upon which the invention is based, any sort of machining representing an expenditure of energy must be avoided, because the energy exerted inevitably takes the form of heat in the master plate and/or the clamping plate, where it causes warping which results in tolerances and inaccuracies which are no longer acceptable.

Based on these perceptions, the present invention in principle avoids a chip-producing deformation in the master plate at any locations where accuracy must be attained. The bores introduced into the master plate serve solely as rough reference points for positioning insert sleeves, whose position is determined by measurement, preferably by using so-called end measures or precision-gauge blocks having an absolute zero dimension for a given spaced-apart relationship.

Since it is impossible to convert a measurement directly into the positional relationship, it is provided in accordance with the present invention that an intermediate step is taken in the form of a so-called pre-fixation or intermediate fastening of the precision insert sleeves loosely in their assigned receiving bores in the master plate, and once all these positions have been fixed unequivocally in the prespecified grid interval dimension and their accuracy determined by another measurement operation, then the sleeves are fixed in the receiving bores by pouring in a settable plastic material.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
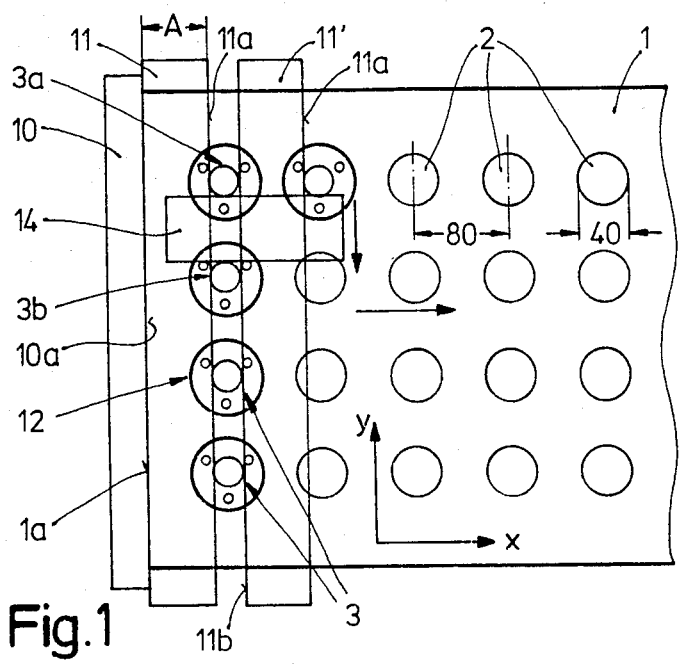
FIG. 1, in highly schematic form, shows a detail of a foundation plate in a specified processing position for producing the master plate.

The fundamental concept of the present invention is the avoidance of any operations representing the expenditure of energy, in the design and disposition of the insertable fitting sleeves in the foundation plate for producing the master plate, which would necessarily be absorbed by the master plate and inevitably converted into heat, which would result in an unacceptable heat-produced warping. Such operations include not only rough processing operations such as chip-producing deformation and the like but also even such subtle operations as the tightening of screws.

It has in fact been discovered by experimentation that merely tightening screws with an appropriate exertion of force produces sufficient heat-produced warping as to cause errors in the master plate which in the final analysis may be as much as 0.2 mm from the insert fitting sleeves at one end of the plate to the other.

The basic concept of the invention is therefore that the insertable fitting sleeves in their roughly pre-drilled receiving bores should first have their eventual final position determined by measurement. Then they should be fixed in the measured position by careful pre-fixation, and finally they should be fixed in final form in the final position by the introduction of a pourable material, beginning for instance at the back side of the foundation plate, and by the hardening of this material.

The procedure will now be described in detail, but it must be noted that numerical dimensions will be provided for the sake of better comprehension of the invention that the execution of the present invention will be explained in detail, and it will be understood that neither these dimensions nor individual detailed steps thereby restrict the scope of the invention.

In a starting foundation plate 1, preliminary bores 2 are made at a specified dimension for grid intervals corresponding to the desired coordinate intervals; naturally polar coordinates or any other conceivable coordinate dimension is possible here. The preliminary bores 2 are drilled with the normally attainable precision, for instance using suitable multiple drilling machines or a numerically controlled realization. The diameter of these preliminary bores 2 is selected to be substantially larger than that of the insert fitting sleeves later to be inserted into these preliminary bores. As a numerical exemplary embodiment for the sake of better comprehension of the invention, the following data can be offered, although they naturally apply only to one desired form of embodiment of the grid interval dimension and of the coordinate network used. The preliminary bores 2 are spaced apart by an interval of about 80 mm from one another, measured from center to center, and the diameter of the preliminary bores 2 is approximately 40 mm by way of example.

Insertable fitting sleeves having the correct inner diameter are then introduced into these preliminary bores, but in a generalized instance these inserts have means for pre-fixation in the preliminary bore, or in other words for being secured to the mounting plate in a suitable manner, after their precise position has been measured. This securing is not the final form of fixation of the insertable fitting sleeves, but instead serves solely to impart to them a positional relationship with the mounting plate which is firm enough that a settable material, perhaps a cement or in a preferred manner a suitable plastic material, can be poured into an annular space or interspace between the outer diameter of the sleeve and the inner diameter of the preliminary bore and then hardened.

Figure 2:
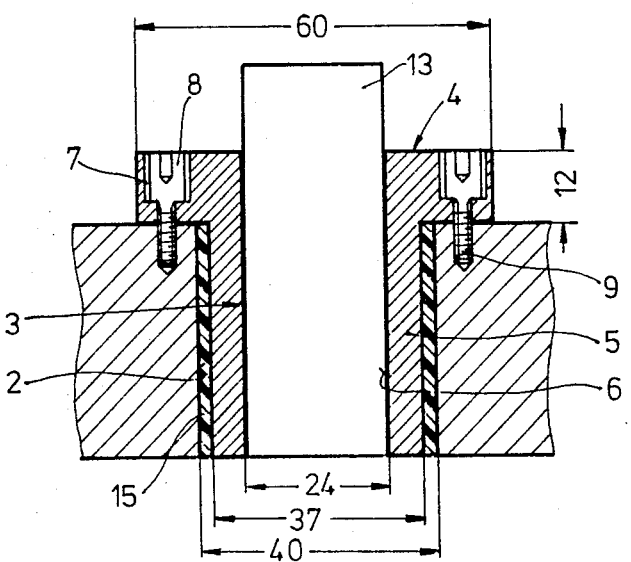
FIG. 2 is a detail of an insertable fitting sleeve and a fitting pin inserted into a bore of the master plate.

In the exemplary embodiment shown in the drawing, the means for pre-fixation comprise an edge flange on the end face of the insert sleeve, which is generally identified as 3 in FIG. 2, while the outer end edge flange is identified as 4. Extrapolating from the numerical dimensions provided above, the outer diameter of the actual sleeve element 5 may be 37 mm, while the diameter of the flange, which may have a thickness of 12 mm, is 60 mm.

The fabrication of an insertable fitting sleeve of this kind having a sleeve element 5 and a flange 4 is first performed as follows: The bore in the insertable fitting sleeve is honed to completion with a diameter in this exemplary instance of 24 mm; that is, it is machined to its absolutely final form. The insertable fitting sleeve 5 is then placed on a mandrel (this is not shown in the drawing, because such operations are obvious to one skilled in the art), and then the outer diameter and in particular the flange are machined relative to the inner sleeve bore 6. This fine finishing or final machining of the flange is effected in order that the flange will extend absolutely coaxial with respect to the inner bore 6 of the insertable fitting sleeve 5 and in order to attain an axial orientation of the flange contact face on the foundation plate 1 that is accurate with respect to the fitting bore 6 of the insertable fitting sleeve 5. In fact it is the flange 4 which according to a preferred exemplary embodiment serves the purpose of pre-fixing the given insertable fitting sleeve 5 after measurement has been accomplished and prior to the final fixation.

To this end, each flange has a prespecified number of bores, preferably countersunk bores 7, distributed about its circumference, which receive the securing means embodied as screws, which in the exemplary embodiment are sink screws 8. As a result of the embodiment of countersunk bores 7, the screws 8, which are socket-head screws, can be countersunk so that they do not protrude beyond the surface of the flange. The flange rests with its lower annular face on the counterpart surface of the mounting plate 1. For receiving the screws 8 as they are threaded into place, the mounting plate 1 has threaded bores 9 located adjacent to the preliminary bores 2 and corresponding to the distribution of the sink bores in a given annular flange 4 of the insertable fitting sleeves; it is thereby possible to secure the insertable fitting sleeves of the mounting plate 1 by threading the screws 8 into the sink bores 6 on the annular flange 4. It will be understood and should be mentioned at this point, however, that the seat of the screws 8 in their countersunk bores 7 of the flange 4 is embodied with sufficient play, with respect to the shank of the screw as well, that before the screws 8 are tightened the particular insertable fitting sleeve will be sufficiently capable of adjusting and displacement movements in any desired horizontal direction.

The next step in fabrication is that a first row of insertable fitting sleeves is inserted into the corresponding receiving bores 2 of the foundation plate 1 and the screws (for example) are then threaded loosely into their threaded bores 8 of the foundation plate such that the fitting sleeves are held to a certain extent.

Their final positioning is effected by measurement; this is accomplished more or less in that a first stop strip 10 is placed against a lateral face 1a of the foundation plate 1, which is cleanly machined and embodied as correspondingly flat; a distance measuring gauge 11 is then contacted by the inside edge 10a of this first stop strip 1a. This gauge 11 represents an absolute zero dimension and its width extension A, which in this case is highly accurate, is therefore dimensioned such that fitting pins 13 introduced into the fitting bore 6 of each insertable fitting sleeve 5 of row 12 can be made to strike the measuring face 11a oriented toward them. In the illustrated exemplary embodiment, therefore, the width A of the gauge having the absolute zero dimension of the desired distance must amount to 56 mm, if the diameter of the fitting pin 13 agrees with the diameter of the fitting bore 6 and the periphery of the various fitting pins strikes the outer face 11a, oriented toward them, of the gauge.

It is clear that in this manner an extremely highly accurate positioning of the insertable fitting sleeves is first attained and assured in the X direction.

For the final positioning in the Y coordinate direction (in the illustrated exemplary embodiment), it is possible, beginning with a first given insertable fitting sleeve, first to secure this sleeve—indicated as 3a in FIG. 1—such that it is centered as accurately as possible in the sense of a pre-fixation, by tightening the associated flange screws 8. It is noted once again that this tightening must be done with particularly great care and virtually only by hand, or in any event for the subsequent insertable fitting sleeves, so as to avoid any conceivable heat-produced warping here. Once the first insertable fitting sleeve 3a is fixed on the foundation plate 1, a further measuring gauge 14 is now used for the purpose of highly accurate positional determination in the Y coordinate direction. If the intervals between the insertable fitting sleeves in the foundation plate 1 are intended to be equal in all directions, then this measuring gauge 14 has the same width A as the gauge 11 for the precision positional determination in the X direction. The gauge 14 is then struck on both sides—this gauge 14 likewise has an absolute zero dimension in the desired distance interval—by the fitting tangs or fitting pins 13 inserted into the fitting bores 6, and the next insertable fitting sleeve 3b (proceeding downward in the plane of the drawing) can then be pre-fixed as well; that is, it can be secured on the foundation plate by the tightening of its flange screws 8.

This procedure is logically repeated until after the first row 12 is finished the second row is begun; this is accomplished by moving the gauge 11 into the position 11', in which position the outer edge 11b of the gauge 11 which was originally made to strike against the outer strip 10 now strikes from the other side against the fitting pins 13 which have been placed in their fitting bores 6. As a result, by means of the opposing rim edge 11a, the stop position for the fitting pins 13 of the next row of insertable fitting sleeves is again attained, effecting their highly accurate positioning first in the X direction and then in succession in the Y direction, the latter by being struck by the second gauge 14 as already explained.

Once the process of locating the various precision positions of the insert sleeves by measurement has proceeded from one side of the foundation plate 1 to the other and all the sleeves have been pre-fixed by means of their flange screws 8, then a measurement is again preformed highly accurately in both the X and Y directions as well as in the diagonal direction. To this end, measuring rules or measuring surfaces or measuring elements in general, having end measures or in other words zero dimensions, can be used so that the work of location by measurement is performed merely by using stop elements.

The last step in fabrication is then that the insertable fitting sleeves, at first held on the foundation plate 1 by the pre-fixation process which is one merely of positive engagement, are now fixed in their final position in an absolutely form-fitting manner, with the aid of pouring technology which is already known per se; that is, an appropriate settable plastic material is introduced into the annular space 15 remaining (FIG. 2) between the outer circumference of the sleeve element 5 and the inner circumference of the preliminary bore 2. This is preferably effected such that the foundation plate is turned over and material is poured all at once into the annular interspaces; special care must also be taken during the fabrication process that the annular interspaces should be as uniform as possible and that an excessive eccentricity of the insertable fitting sleeve in its associated bore not be permitted, which could also cause shifts in tolerance in terms of accuracy in this case because of varying conditions under which the plastic material hardens.

After the plastic material has set, the insertable fitting sleeves are fixed in position absolutely and highly precisely in the foundation plate 1, and the master plate which is required for one use is now complete.

The rest of the process of fabricating the mounting plates is such that insert sleeves are pushed for instance onto the fitting pins 13 which have been placed in their fitting bores 6; these insert sleeves are now intended for the particular mounting plate now to be fabricated. Then a given clamping plate, again having preliminary bores having a larger diameter than the outer diameter of the further insert sleeves pushed onto the fitting pins 13, is placed upon the master plate, and the settable plastic material is poured into the resultant annular interval between the preliminary bores in the clamping plate and the outer diameters of their insert sleeves.

Since this is all effected with highly accurate precision, it is possible that there may be difficulty associated with lifting the mounting plate away from the master plate at this point; this separation can therefore be performed such that the fitting pins 13 are continuously pressed downward and out of the insert sleeves in the mounting plate after the plastic has set, so that the clamping plate will effortlessly separate from the master plate. The accuracy of the master plate will then have been conferred practically unchanged, by a sort of law of heredity, upon the mounting plate then produced. However, this is not the subject of the present invention and is furthermore explained in German Pat. No. 25 57 101.

The foregoing relates to preferred exemplary embodiments of the invention, it being understood that other variants and embodiments thereof are possible within the spirit and scope of the invention, the latter being defined by the appended claims.

What is claimed and desired to be secured by Letters Patent of the United States is:

1. A method for producing a master plate having highly accurate fitting bores for fitting pins disposed at pre-specified coordinate intervals in order to form a grid system, for use as an initial template gauge plate for making clamping plates for grid-type clamping systems, comprising drilling preliminary bores in a foundation plate at a specified dimension of grid intervals with normal accuracy and with a greater diameter than an outer diameter of said fitting bores, forming a plurality of fitting sleeves each with an end flange having an outer diameter which is greater than said preliminary bores in precise coaxial alignment with an inner bore of said fitting sleeves with an outer diameter of said sleeves of lesser diameter than said preliminary bores in said foundation plate, inserting said fitting sleeves into said previously drilled preliminary bores in said foundation plate thereby forming an annular interspace between the outer diameter of said fitting sleeves and said preliminary bores in said foundation plate, accurately positioning the fitting sleeves in a given precise position in said preliminary bores by measurement and positioning said sleeves in both the X and Y directions with equal measurements between each of said sleeves in both the X and Y directions, mechanically pre-fixing said sleeves in their given precise position which has been located by measurement in both the X and Y directions, and introducing a settable plastic material into the annular interspace between the outer circumference of said fitting sleeves and said preliminary bores and permitting the plastic material to harden thereby fixing said sleeves in their precise position in both the X and Y direction.

2. A method as defined in claim 1, whereby the steps for locating the precision positions of the given inserted fitting sleeves by measurement comprises, positioning an accurately machined stop strip along one edge of the foundation plate, in a given coordinate direction using a given insertable fitting sleeve fixed arbitrarily in its position, interval measurements are taken, with reference to the position of the arbitrarily fixed sleeve relative to said stop strip, for the purpose of precise positioning of subsequent sleeves.

3. A method as defined in claim 1, comprising accurately machining one edge of said foundation plate in a Y-direction, positioning a measuring stop strip against said accurately machined foundation plate edge, inserting fitting pins in said fitting sleeves, positioning a first measuring gauge having a zero dimension tolerance corresponding to the desired distance between said fitting sleeves along-side said measuring stop strip between said measuring strip and said fitting pins inserted into the fitting bores of each insertable fitting sleeve for pre-fixing said inserted sleeves in the X-direction, moving said fitting sleeve so that said fitting pin rests against one free rim edge of the zero-dimension measuring gauge for the purpose of fixing said fitting sleeve in the first coordinate direction.

4. A method as defined by claim 2, comprising accurately machining one edge of said foundation plate in a Y-direction, positioning a measuring stop strip against said accurately machined foundation plate edge, inserting fitting pins in said fitting sleeves, positioning a first measuring gauge having a zero dimension tolerance corresponding to the desired distance between said fitting sleeves along-side said measuring stop strip between said measuring strip and said fitting pins inserted into the fitting bores of each insertable fitting sleeve for pre-fixing said inserted sleeves in the X-direction, moving said fitting sleeve so that said fitting pin rests against one free rim edge of the zero-dimension measuring gauge for the purpose of fixing said fitting sleeve in the first coordinate direction.

5. A method as defined by claim 3, which comprises beginning with a first insertable fitting sleeve pre-fixed in its X-direction position, placing a second measuring gauge having a zero dimension tolerance with respect to the desired distance against the fitting sleeve fitting pin of a first X-direction pre-fixed fitting sleeve in the Y-direction, moving the fitting sleeve of the next X-direction pre-fixed fitting sleeve so that said fitting pin therein strikes against said second measuring gauge, pre-fixing said fitting sleeve in the Y-direction moved position relative to said second measuring gauge, repeating the above steps for each fitting sleeve pre-fixed in the X-direction until the first row of insertable fitting sleeves has been finally positioned and pre-fixed, then the first measuring gauge is placed in the Y-direction with one rim edge against the fitting pins inserted in the first row of finally positioned fitting sleeves, then moving the fitting sleeves of the next row so that the fitting pins are made to strike against the opposing rim edge of said first measuring gauge for the purpose of pre-fixing said second row of fitting sleeves in the X-direction, with the first measuring gauge in position, positioning the second measuring gauge for prefixing said fitting sleeves of the second row in the Y-direction, and continuing for each row of fitting sleeves.

6. A method as defined by claim 4, which comprises beginning with a first insertable fitting sleeve pre-fixed in its X-direction position, placing a second measuring gauge having a zero dimension tolerance with respect to the desired distance against the fitting sleeve fitting pin of a first X-direction pre-fixed fitting sleeve in the Y-direction, moving the fitting sleeve of the next X-direction pre-fixed fitting sleeve so that said fitting pin therein strikes against said second measuring gauge, pre-fixing said fitting sleeve in the Y-direction moved position relative to said second measuring gauge, repeating the above steps for each fitting sleeve pre-fixed in the X-direction until the first row of insertable fitting sleeves has been finally positioned and pre-fixed, then the first measuring gauge is placed in the Y-direction with one rim edge against the fitting pins inserted in the first row of finally positioned fitting sleeves, then moving the fitting sleeves of the next row so that the fitting pins are made to strike against the opposing rim edge of said first measuring gauge for the purpose of pre-fixing said second row of fitting sleeves in the X-direction, with the first measuring gauge in position, positioning the second measuring gauge for pre-fixing said fitting sleeves of the second row in the Y-direction, and continuing for each row of fitting sleeves.

7. A method as defined in claim 5 which comprises remeasuring the location of all pre-fixed fitting sleeves of a given foundation plate in the X and Y directions and in the diagonal direction and re-positioning any fitting sleeves out-of measurement, then turning the foundation plate over and introducing a hardenable plastic material into all the annular interspaces and let set until hardened.

8. A method as defined in claim 6 which comprises remeasuring the location of all pre-fixed fitting sleeves of a given foundation plate in the X and Y directions and in the diagonal direction and re-positioning any fitting sleeves out-of measurement, then turning the foundation plate over and introducing a hardenable plastic material into all the annular interspaces and let set until hardened.

9. A method as defined by claim 7, characterized in that the rim flange has countersunk bores, preferably three in number, distributed uniformly about its circumference, into which bores screws are inserted with sufficient play for the purpose of adjustment in the X and Y direction by means of the location by measurement and are then tightened firmly following the location by measurement in the Y-direction.

10. A method as defined by claim 8, characterized in that the rim flange has countersunk bores, preferably three in number, distributed uniformly about its circumference, into which bores screws are inserted with sufficient play for the purpose of adjustment in the X and Y direction by means of the location by measurement and are then tightened firmly following the location by measurement in the Y-direction.

11. A master plate, produced by the method defined by claim 1, characterized in that insertable fitting sleeves held in rough preliminary bores by means of a hardened plastic material are disposed in it at the grid intervals, with each of said sleeves having a fitting bore for receiving a fitting pin and an annular flange on one end face, which annular flange rests with its outer rim on the contact face of the foundation plate.

12. A master plate as defined by claim 11, characterized in that the fitting pins holding the insert sleeves for given clamping plates to be produced at the precise grid intervals are supported in a slidably displaceable manner in their fitting bores such that the fitting pins can be pressed out of the insert sleeves of the given clamping plate for the purpose of separating the master plate from the mounting plate.

13. A method of forming clamping plates for use in machining workpieces as well as for building machinery which comprises forming a master plate as set forth in claim 7, making a lay-out on said clamping plate having a predetermined coordinate pattern for locating positions for holes to be bored which correspond to holes in said master plate, boring a plurality of holes corresponding to the lay-out with the diameters of the holes greater than the desired size, placing the master plate on a flat surface, inserting a fitting pin in each of the prefixed fitting sleeves of said master plate, placing a fitting sleeve having a flange on one end over each of said fitting pins with their flange end toward said master plate, placing the pre-drilled clamping plate over the fitting sleeves on the fitting pins, moving the clamping plate relative to the fitting sleeves so that an annular space is therebetween, applying an age hardening material into said annular spaces, allowing the age hardening material to set, and then removing said clamping plate from said master plate.

14. A method as set forth in claim 13 wherein said fitting pins are removed previous to removal of said clamping plate from said master plate.

* * * * *